United States Patent
Simonson

(10) Patent No.: US 7,094,119 B2
(45) Date of Patent: *Aug. 22, 2006

(54) LIFE PRESERVER ASSEMBLY

(76) Inventor: Peter M. Simonson, 20 Lighthouse Point Dr., Long Boat Key, FL (US) 34228

( * ) Notice: Subject to any disclaimer, the term of this patent is extended or adjusted under 35 U.S.C. 154(b) by 0 days.

This patent is subject to a terminal disclaimer.

(21) Appl. No.: 11/194,940

(22) Filed: Aug. 2, 2005

(65) Prior Publication Data

US 2005/0266747 A1 Dec. 1, 2005

Related U.S. Application Data

(63) Continuation-in-part of application No. 10/797,356, filed on Mar. 10, 2004, now Pat. No. 6,923,698.

(51) Int. Cl.
*B63C 9/08* (2006.01)

(52) U.S. Cl. ............................ 441/106; 441/115
(58) Field of Classification Search ........ 441/106–108, 441/111–120, 122
See application file for complete search history.

(56) References Cited

U.S. PATENT DOCUMENTS

| | | | | | |
|---|---|---|---|---|---|
| 3,371,363 | A | * | 3/1968 | Blanc, Jr. | 441/118 |
| 3,383,722 | A | * | 5/1968 | Blanc, Jr. | 441/118 |
| 4,380,441 | A | * | 4/1983 | Harr et al. | 441/112 |

* cited by examiner

*Primary Examiner*—Jesus D. Sotelo
(74) *Attorney, Agent, or Firm*—Akerman Senterfitt

(57) ABSTRACT

A life preserver assembly includes a substantially planar main body portion formed from a buoyant material and separation means defining in said main body portion at least one life preserver. The separation means permits the life preserver to be removed from the main body portion. The life preserver is a unitary U shaped structure where the life preserver is preassembled for immediate use.

13 Claims, 6 Drawing Sheets

LIFE PRESERVER ASSEMBLY

STATEMENT OF CROSS REFERENCE TO RELATED APPLICATIONS

This application is a continuation-in-part application of U.S. patent application Ser. No. 10/797,356 filed Mar. 10, 2004, now U.S. Pat. No. 6,923,698, issued Aug. 2, 2005, the entirety of which is herein incorporated by reference.

FIELD OF THE INVENTION

This invention relates generally to life saving devices, and more particularly to life preservers.

BACKGROUND OF THE INVENTION

Life preservers are a necessary safety precaution for boats and aircraft flying over water. The buoyant material from which many life preservers are constructed is a polymer foam which is lightweight but bulky and consequently is difficult to store on boats or planes where there is a limited amount space for storage. The lack of storage space combined with the generally bulky nature of life preservers can result in operators not carrying life preservers, or not carrying a sufficient number of life preservers to accommodate each passenger.

SUMMARY OF THE INVENTION

In accordance with the inventive arrangements, a life preserver assembly is provided. The life preserver assembly can include a substantially planar main body portion formed from a buoyant material and separation means defining in the main body portion at least one life preserver, and permitting the life preserver to be removed from the main body portion. The life preserver can be a unitary structure of one or more portions where the life preserver is preassembled for immediate use. Further, the life preserver can be a unitary U-shaped structure. In one arrangement, the main body portion can provide a plurality of life preservers arranged in alternating orientation. Further, the life preservers can be arranged such that a portion of the each life preserver is stored between the arms of the U shaped structure of each life preserver.

In another embodiment, a life preserver assembly provides a plurality of substantially planar main body portions formed from a buoyant material and separation means defining in the main body portion at least one life preserver, and permitting the life preserver to be removed from the main body portion, the separation means comprising scoring between the life preserver and the main body portion. Connecting structure is also provided for connecting the plurality of substantially planar main body portions. The connecting structure can support the plurality of substantially planar main body portions in a stacked arrangement. Further, two substantially planar main body portions can provide a surface to which the connecting structure is disposed. Additional connecting structure can be disposed on an opposite surface of one of the two substantially planar main body portions and on the surface of the substantially planar main body portion immediately adjacent thereto. A cover for the substantially planar main body portions can also be provided.

In another embodiment, a life preserver assembly can provide a flexible main body portion and separation means defining in the main body portion at least one inflatable life preserver. The separation means permit the inflatable life preserver to be removed from the main body portion and the inflatable life preserver can be a unitary U-shaped structure. The main body portion can provide a plurality of life preservers arranged in alternating orientation and the life preservers can be arranged such that a portion of the each life preserver is stored between the arms of the U-shaped structure of each life preserver. Additionally, the main body can be a roll housing a plurality of life preservers.

A method for storing a life preserver is also provided. The method includes providing a flexible main body portion and separation means defining in the main body portion at least one inflatable life preserver, and permitting the inflatable life preserver to be removed from said main body portion. The method also provides the step of rolling the flexible main body portion into a roll.

BRIEF DESCRIPTION OF THE DRAWINGS

There are shown in the drawings embodiments which are presently preferred, it being understood, however, that the invention is not limited to the precise arrangements and instrumentalities shown, wherein:

FIG. 11b is a plan view of the life preserver assembly of FIG. 11a.

FIG. 11c is a perspective view of the life preserver assembly of FIG. 11a.

DETAILED DESCRIPTION OF THE PREFERRED EMBODIMENTS

Figure 1:
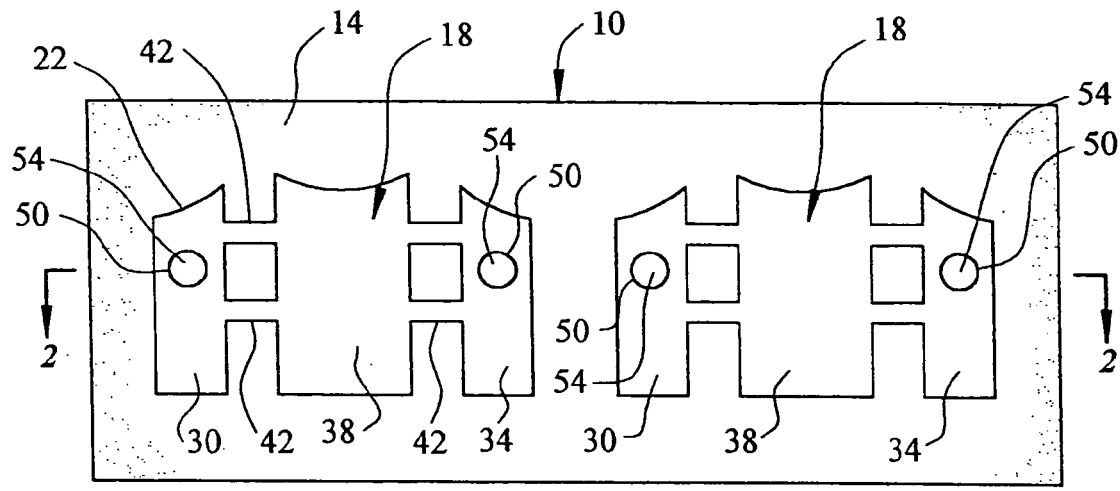
FIG. 1 is a plan view of a life preserver assembly according to the invention.
Figure 2:
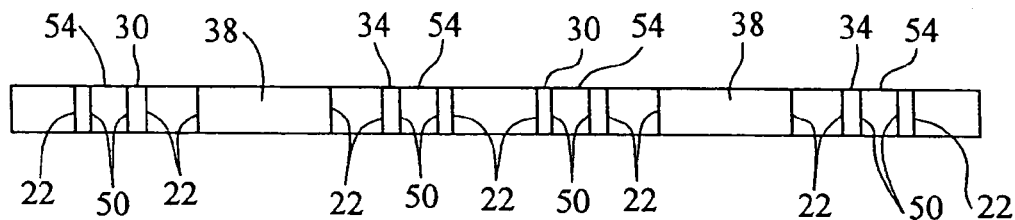
FIG. 2 is a cross section taken along the line 2—2 in FIG. 1.

There is shown in FIG. 1 a life preserver assembly 10 according to the invention. The life preserver assembly 10 includes a main body portion 14 and at least one life preserver 18. Separation means such as scoring 22 defines the outline of the life preserver 18. The scoring 22 permits the life preserver 18 to be removed from the main body portion 14 by pushing or pulling the life preserver 18 from the main body portion 14. The scoring 22 extends through the main body portion as shown in FIG. 2. It will be appreciated that the separation means can alternatively comprise perforations or partial scoring such that separation means is frangible and the life preserver 18 can be removed from the main body portion 14 with slight pressure.

The main body portion 14 and life preserver 18 can be formed from any suitable material. The material is buoyant so that the life preserver 18 can perform the life saving function. Foamed polymers which are buoyant can be used for this purpose. These materials are easily manipulated to score or perforate so as to form the separation means 22. Other materials are possible.

Figure 3:
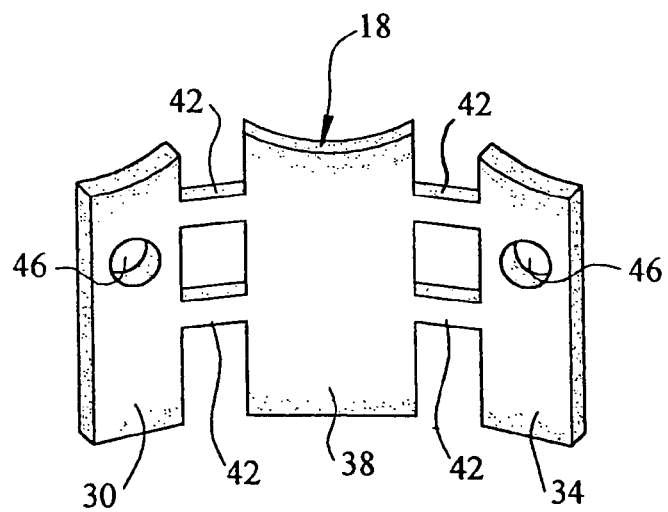
FIG. 3 is a perspective view of a life preserver according to the invention.

The life preserver 18 can be of any suitable shape or size. In the embodiments shown in FIGS. 1-3, the life preserver 18 comprises right chest portion 30, left chest portion 34, and center back portion 38. The separation means 22 can further define connecting structure 42 for connecting the right chest portion 30 to the center back portion 38, and for connecting the left chest portion 34 to the center back portion 38. Other constructions are possible. Arm hole 46 can be provided by scoring 50 in the right chest portion 30 and left chest portion 34 to permit the removal of arm hole portions 54 to form the arm holes. Other constructions are possible.

Figure 10A:
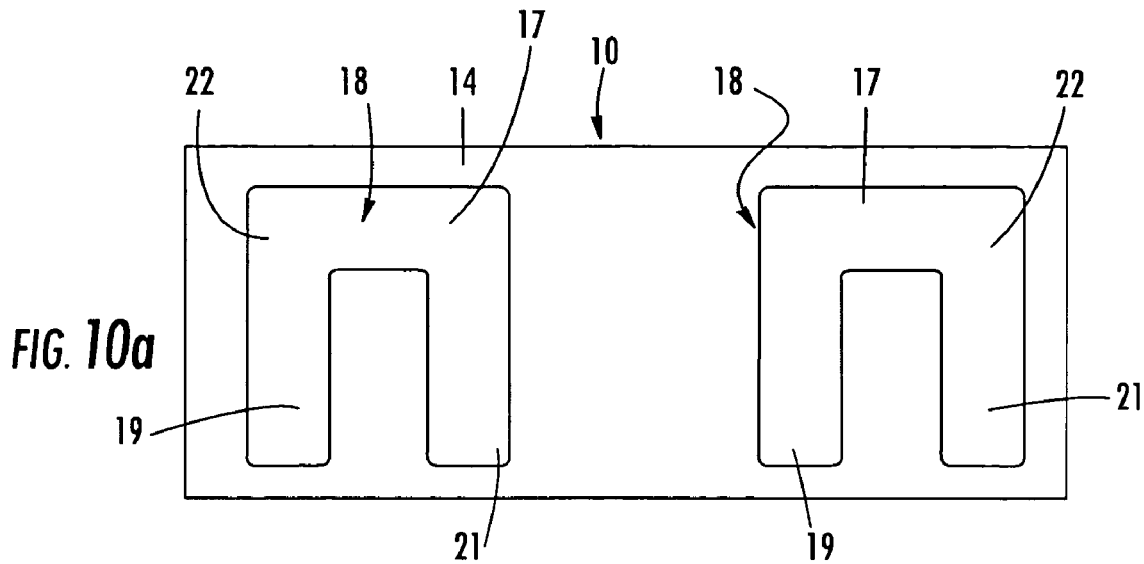
FIG. 10a is a plan view of another embodiment of the life preserver assembly in accordance with the inventive arrangements.

For instance, an alternative embodiment is shown in FIG. 10a in accordance with the inventive aspects. A life preserver 18 is shown having a unitary construction with arms 19 and 21 and a connecting portion 17. The arms 19 and 21 form a general U shape; however, the life preserver 18 of unitary construction is not limited in this regard. Advantageously, the life preserver 18 of unitary construction does not require assembly by connecting various portions prior to use and can be used immediately after removal from the body portion 14. In this arrangement, the life preserver 18 can be considered pre-assembled, which can provide life-saving advantages in life threatening time sensitive situations. Nevertheless, such a unitary construction does not prohibit the inclusion of connecting structure, such as straps or buckles on arms 19 and/or 21, for securing the life preserve 18 to its user.

Figure 10B:
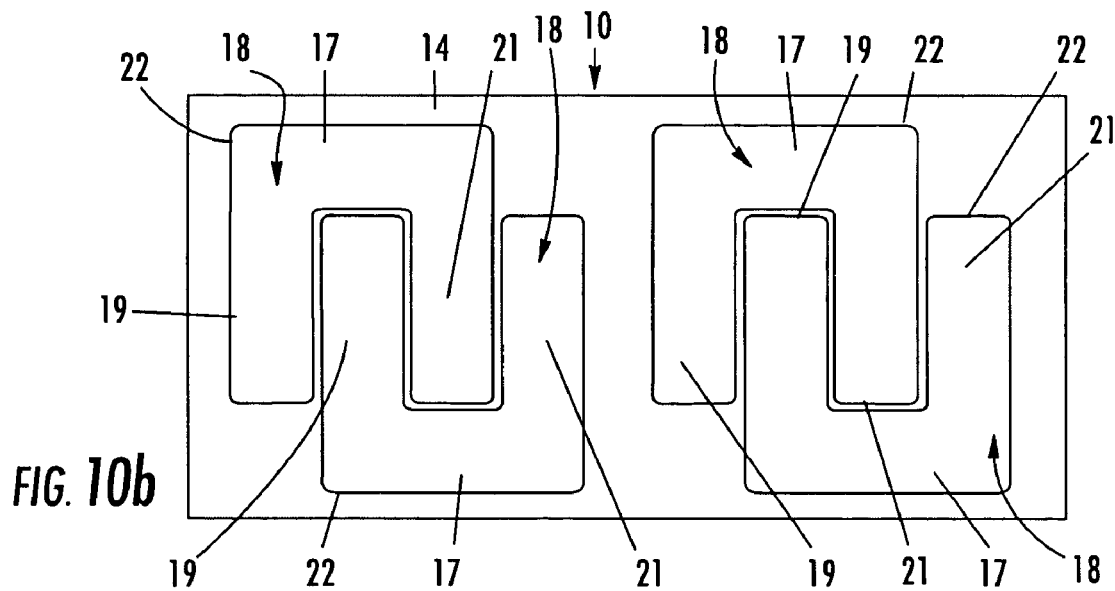
FIG. 10b is a plan view of another embodiment of the life preserver assembly in accordance with the inventive arrangements.

There is another alternative arrangement of assembly 10 shown in FIG. 10b. FIG. 10b illustrates a material and space maximizing arrangement of a plurality of life preservers 18. The general U shape and unitary construction of life preserver 18 allows for compact arrangement within body portion 14. The life preservers 18 are alternated in orientation and overlap such that the arm 19 and/or 21 of each life preserver 18 lies within the arms 19 and 21 or another life preserver. This arrangement incorporates the material between the U shape of each life preserver 18. This maximizing arrangement substantially eliminates unused body portion 14 and can provide substantial space savings while providing a greater number of life preservers 18.

The main body portion 14 can have any suitable size or shape. In the embodiment shown in FIGS. 1–2, the main body portion is elongated so as to permit two or more life preservers 18 to be stored within the main body portion 14. This can have any suitable size but in one embodiment is approximately 6'×3'×1". This is approximately the size of most recreational flotation devices which permit the user to lie on the device while floating on water, and the life preserver assembly 10 can be used for this purpose. Alternatively, the life preserver 10 can be used as a mat or as a seat cushion. Other shapes and sizes are possible.

Figure 4:
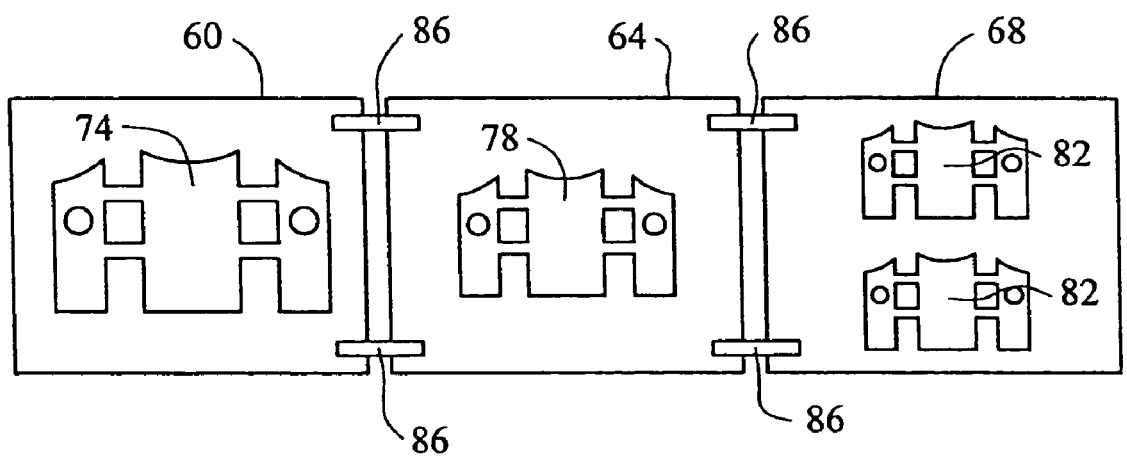
FIG. 4 is a plan view of an alternative embodiment.
Figure 5:
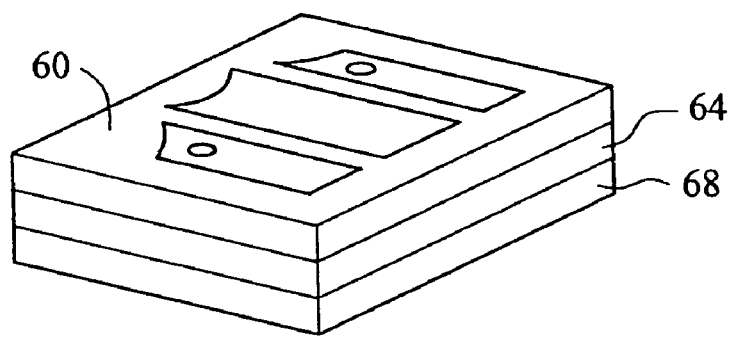
FIG. 5 is a perspective view of the embodiment of FIG. 4 and in a second configuration.

There is shown in FIG. 4 an alternative embodiment in which the main body portion is segmented into segments 60, 64 and 68. More or fewer segments are possible. The segments 60, 64 and 68 each contain at least one life preserver. The segments can contain the same life preserver, or different sizes, shapes, or types of life preservers. In one aspect the segment 60 includes an adult dimensioned life preserver 74. The segment 64 contains a child size life preserver 78. The segment 68 contains two infant sized life preservers 82. The segments are connected by connecting structure 86. The connecting structure 86 can be straps, cords, or any other suitable structure. Disassembly of the connecting structure 86 permits the segments 60, 64 and 68 and 70 to be stacked as illustrated in FIG. 5. Segment 70 can include one or more life vests, such as life vest 74, or 82 and is not limited in this regard.

Figure 11A:
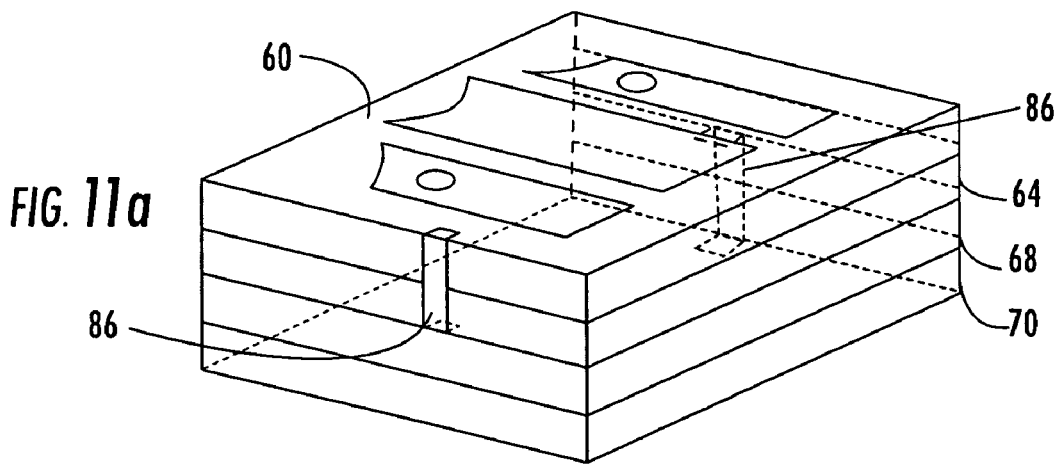
FIG. 11a is a perspective view of one embodiment of the life preserver assembly in accordance with the inventive arrangements.
Figure 11B:
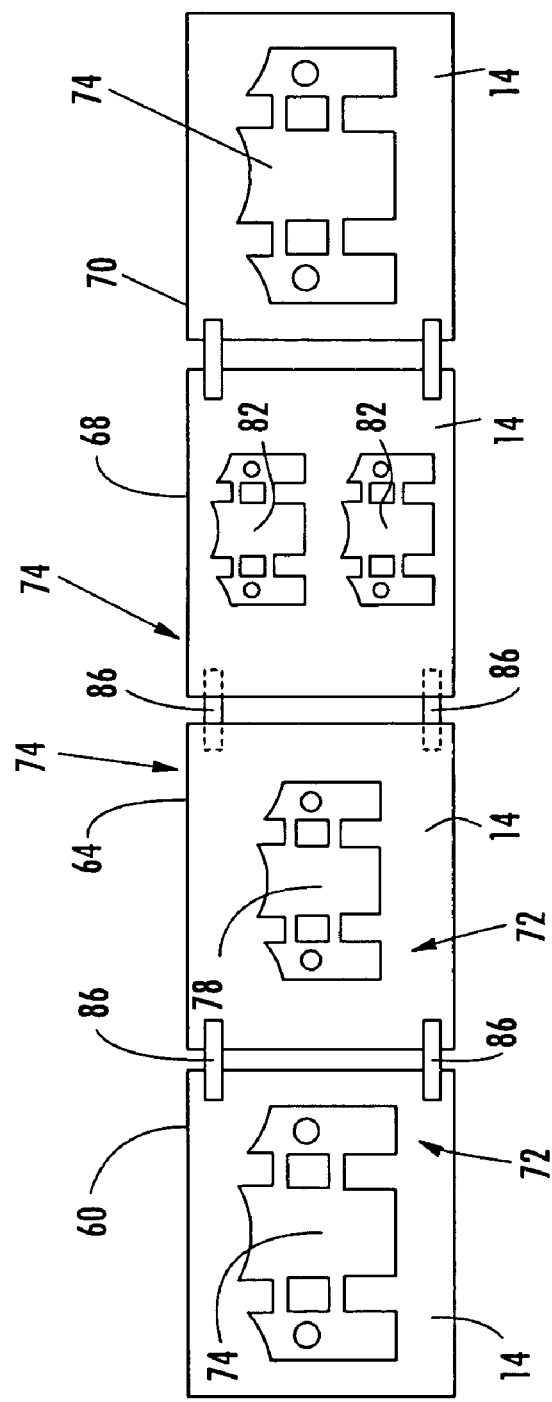
Figure 11C:
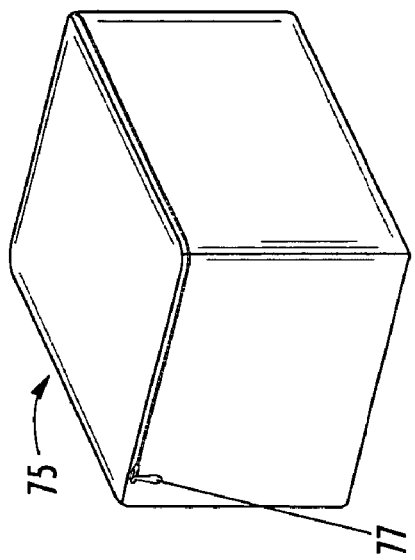

In another embodiment shown in FIGS. 11a–11c, additional segments can be included in the stacked arrangement. In this configuration, the stack can function as a seat, table and/or a footrest. The connecting structure 86 can be fixed to the segments 60, 64 and 68, or can be detachable.

The connecting structure 86 can be located on the opposite surfaces of the body portion 14 in an alternating arrangement that not only allows the segments to be stacked without removing the connecting structure 86, but also provides support to the stack. Segments 60 and 64 are two substantially planar main body portions that provide a surface 72 to which said connecting structure 86 is disposed. Further connecting structure 86 is also disposed on an opposite surface 74 of segment 64 and on the surface 74 of segment 68, the substantially planar main body portion immediately adjacent thereto. The alternating arrangement of disposing connecting structure 86 can be repeated as necessary.

Such an arrangement allows for the segments 60, 64, 68, 70 and so forth to be stacked while still connected to each other to provide rigidity and support to the stack as a whole. With the connecting structure 86, the stack can easily support greater loads, such as providing a seat for a passenger, and will not become unstacked in even turbulent traveling conditions.

Still further, as shown in FIG. 11c, a cover 75 can be provided for storing the segments 60, 64, 68, 70 and so forth. The cover 75 can provide the benefit of protection from the elements and can provide additional support to a stack for supporting increase weights. Additionally, with a snug fit, the amount of support provided by the cover 75 can be increased. The cover 75 can include a structure for fastening the cover closed, such as zipper 77. The cover can be any suitable material, such as nylon.

Figure 6:
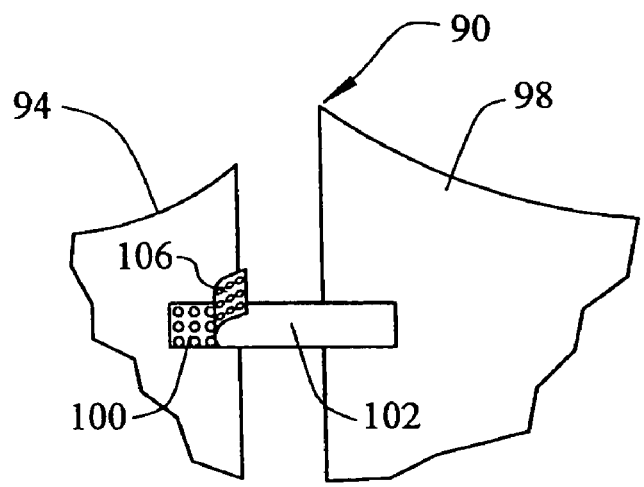
FIG. 6 is a plan view illustrating fastening structure for securing segments according to the invention.

The connecting structure for connecting the life preserver portions can vary. There is shown in FIG. 6 a life preserver 90 having a right chest portion 94 and center back portion 98. Connecting structure 102 in the form of a strap is provided. The strap 102 can have hook and loop structure 106 which cooperates with hook and loop structure 110 on the right chest portion 94 and center back portion 98. The life preserver 90 is removed from the main body portion and the strap 102 is fixed to the cooperating hoop and loop structure 110 on each of the life preserver portions so as to connect the life preserver portions to form the life preserver 90. Alternative connecting structure and fastening structure for securing the connecting structure is possible, such as snaps, buttons and the like.

Figure 7:
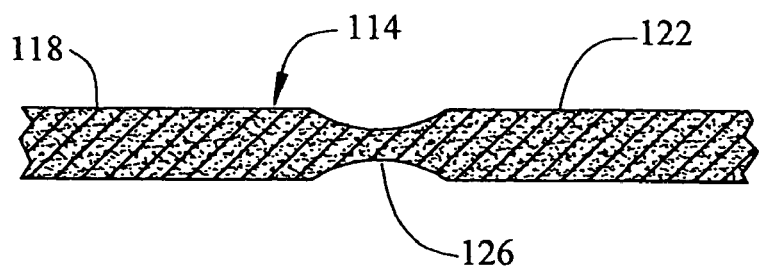
FIG. 7 is a cross-section illustrating separation means according to one aspect of the invention.

The separation means can be any suitable structure for permitting the life preserver to be removed from the main body portion. There is shown in FIG. 7 a portion of a life preserver 114 including a right chest portion 118 and a center back portion 122. A thinned portion 126 is provided and connects the right chest portion 118 to the center back portion 122. The thinned portion 126 is frangible and can be broken to separate the right chest portion 118 from the center back portion 122.

Figure 8:
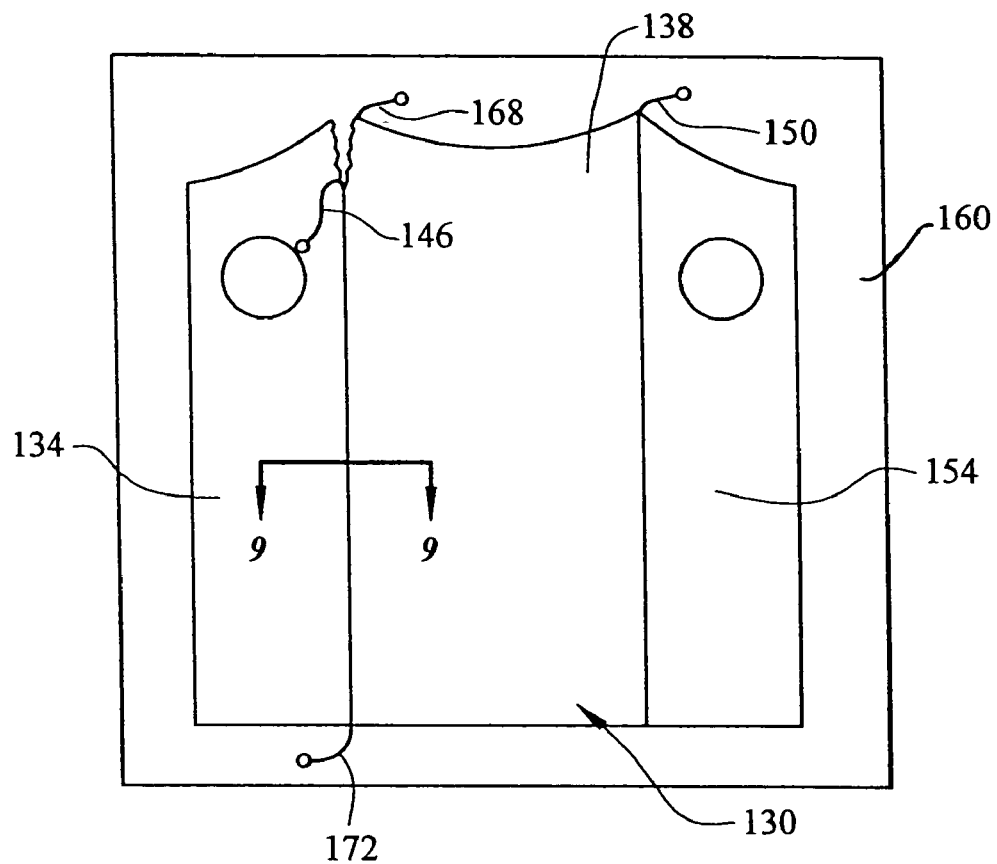
FIG. 8 is a cross-section illustrating alternative separation means.
Figure 9:
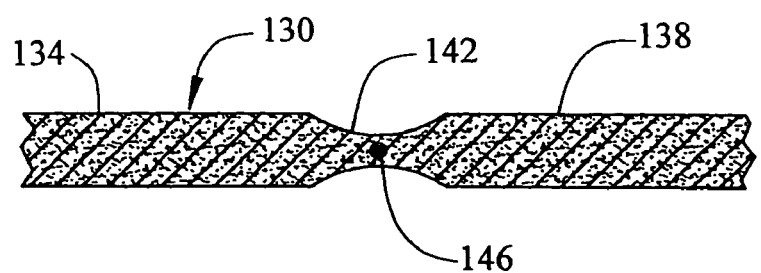
FIG. 9 is a plan view illustrating the use of the separation means of FIG. 8.

The separation means can comprise structure for breaking or disconnecting the life preserver portions from the main body portion and from one another. There is shown in FIGS. 8–9 a life preserver 130 in which a right chest portion 134 is separated from the center back portion 138 by separation means 142, which can include a thinned, perforated, or scored portion. A pull tab 146 is provided. The pull tab 146 can be utilized to separate the right chest portion 134 from the center back portion 138. A similar pull tab 150 can be utilized to separate the left chest portion 154 from the center back portion 138, as shown in FIG. 8. The pull tabs 146 and 150 can extend about the circumference of the right chest portion 134 and left chest portion 154 so as to completely separate these portions from the main body portion 160 and the center back portion 138. Other pull tabs 168 and 172 can be provided to separate the remaining portions of the life preserver 130.

Figure 12:
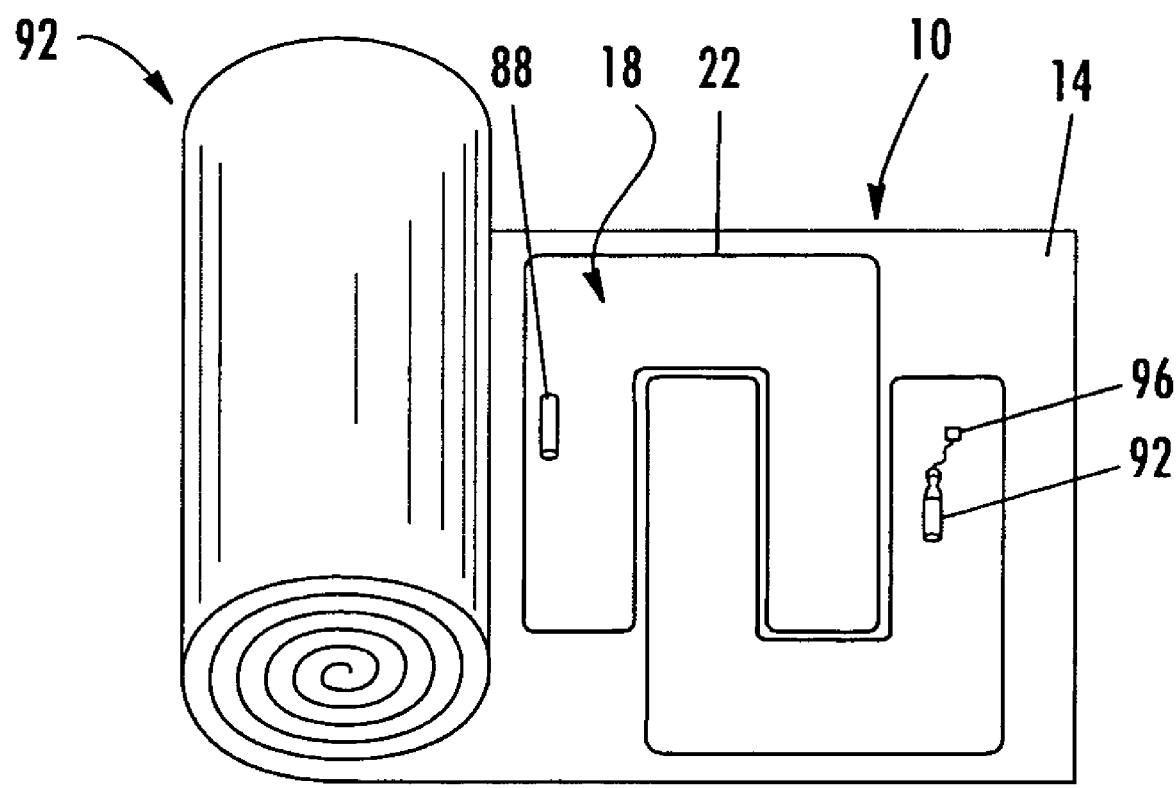
FIG. 12 is a perspective view of another embodiment of a life preserver assembly in accordance with the inventive arrangements.

There is shown in FIG. 12 another embodiment of a life preserver assembly 10. Life preserver 18 can be an inflatable life preserver 18 and separatable from an un-inflated main body portion 14 via separation means 22. The life preserver 18 can be constructed of any suitable material, such as nylon, and can be inflated via a manual inflation tube 88 or a $CO_2$ cartridge, operable by pull tag 96. To conserve space, main body portion 14 can be stored in a rolled arrangement 92 as shown.

This invention can be embodied in other forms without departing from the spirit or central attributes thereof, and accordingly, reference should be had to the following claims, rather than to the foregoing specification, as indicated in the scope of the invention.

I claim:

1. A life preserver assembly, comprising:
    a substantially planar main body portion formed from a buoyant material and separation means defining in said main body portion at least one life preserver, and permitting said life preserver to be removed from said main body portion;
    said life preserver comprising a unitary structure of at least one portion; and
    whereby said life preserver is preassembled for immediate use.

2. The life preserver assembly according to claim 1, wherein said unitary structure is generally U-shaped, and said main body portion provides a plurality of life preservers arranged in alternating orientation.

3. The life preserver assembly according to claim 2, wherein said life preservers are arranged such that a portion of the each life preserver is stored between the arms of the U shaped structure of each life preserver.

4. The life preserver assembly according to claim 1, wherein said unitary structure is generally U-shaped.

5. A life preserver assembly, comprising:
    a plurality of substantially planar main body portions formed from a buoyant material and separation means defining in said main body portion at least one life preserver, and permitting said life preserver to be removed from said main body portion, said separation means comprising scoring between said life preserver and said main body portion; and
    connecting structure for connecting said plurality of substantially planar main body portions; and
    wherein said connecting structure supports said plurality of substantially planar main body portions in a stacked arrangement.

6. The life preserver assembly according to claim 5, wherein two substantially planar main body portions provide a surface to which said connecting structure is disposed, further connecting structure is disposed on an opposite surface of one of the two substantially planar main body portions and on the surface of the substantially planar main body portion immediately adjacent thereto.

7. The life preserver assembly according to claim 5, further providing a cover for enclosing said substantially planar main body portions.

8. A life preserver assembly, comprising:
    a flexible main body portion and separation means defining in said main body portion at least one inflatable life preserver, and permitting said inflatable life preserver to be removed from said main body portion; and
    said inflatable life preserver comprising a unitary structure.

9. The life preserver assembly according to claim 8, wherein said main body portion provides a plurality of life preservers arranged in alternating orientation.

10. The life preserver assembly according to claim 9, wherein the life preserver is generally U-shaped, and said life preservers are arranged such that a portion of at least one life preserver is stored between the arms of the U shaped structure of at least one other life preserver.

11. The life preserver assembly according to claim 8, wherein said main body comprises a roll housing a plurality of life preservers.

12. The life preserver assembly according to claim 8, wherein the life preserver is generally U-shaped.

13. A method for storing a life preserver, comprising the steps of:
    providing a flexible main body portion and separation means defining in said main body portion at least one inflatable life preserver, and permitting said inflatable life preserver to be removed from said main body portion; and
    rolling said flexible main body portion into a roll.

* * * * *